(12) United States Patent  
Tang et al.

(10) Patent No.: US 11,330,417 B2  
(45) Date of Patent: May 10, 2022

(54) METHOD FOR ELECTROMAGNETIC INTERFERENCE ADJUSTMENT AND RELATED DEVICES

(71) Applicant: GUANGDONG OPPO MOBILE TELECOMMUNICATIONS CORP., LTD., Guangdong (CN)

(72) Inventors: Kai Tang, Guangdong (CN); Zhengpeng Tan, Guangdong (CN); Yun Chen, Guangdong (CN); Lizhong Wang, Guangdong (CN); Hai Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/320,203

(22) Filed: May 13, 2021

(65) Prior Publication Data

US 2021/0266721 A1 Aug. 26, 2021

Related U.S. Application Data

(63) Continuation of application No. PCT/CN2019/107561, filed on Sep. 24, 2019.

(30) Foreign Application Priority Data

Nov. 15, 2018 (CN) .......................... 201811360758.0

(51) Int. Cl.
*H04W 4/80* (2018.01)
*G09G 3/20* (2006.01)
(Continued)

(52) U.S. Cl.
CPC ............ *H04W 4/80* (2018.02); *G09G 3/2096* (2013.01); *H04W 52/029* (2013.01);
(Continued)

(58) Field of Classification Search
CPC ..... H04W 4/80; H04W 52/029; H04W 72/02; H04W 72/048; H04W 72/082;
(Continued)

(56) References Cited

U.S. PATENT DOCUMENTS

| 2014/0256247 A1* | 9/2014 | Wietfeldt .............. H04W 76/10 455/39 |
| 2017/0118759 A1 | 4/2017 | Choi et al. |

FOREIGN PATENT DOCUMENTS

| CN | 105827775 | 8/2016 |
| CN | 106160759 | 11/2016 |

(Continued)

OTHER PUBLICATIONS

SIPO, First Office Action for CN Application No. 201811360758.0, dated Dec. 2, 2019.
SIPO, Second Office Action for CN Application No. 201811360758.0, dated Mar. 11, 2020.
SIPO, Notification to Grant Patent Right for Invention for CN Application No. 201811360758.0, dated Aug. 14, 2020.
(Continued)

*Primary Examiner* — Eugene Yun
(74) *Attorney, Agent, or Firm* — Hodgson Russ LLP

(57) ABSTRACT

A method for electromagnetic interference adjustment and related products are provided. A current first operating frequency of a MIPI of the display is obtained by the AP, and in response to detecting that a screen state is a screen-on state and the Bluetooth assembly is enabled, a current second operating frequency of the Bluetooth assembly is obtained by the AP. Electromagnetic interference in the electronic device is detected by the AP according to the first operating frequency and the second operating frequency. In response to the detected electromagnetic interference, a target operating frequency of the MIPI is determined, and the operating frequency of the MIPI is adjusted from the first operating frequency to the target operating frequency by the AP.

17 Claims, 5 Drawing Sheets

(51) Int. Cl.
    *H04W 52/02*     (2009.01)
    *H04W 72/02*     (2009.01)
    *H04W 72/04*     (2009.01)
    *H04W 72/08*     (2009.01)

(52) U.S. Cl.
    CPC ......... *H04W 72/02* (2013.01); *H04W 72/048* (2013.01); *H04W 72/082* (2013.01); *G09G 2330/06* (2013.01)

(58) Field of Classification Search
    CPC .. G09G 3/2096; G09G 2330/06; H04B 15/02; H04B 17/345; H04B 1/1027; H04B 2001/1072
    USPC .......................................................... 455/75
    See application file for complete search history.

(56) References Cited

FOREIGN PATENT DOCUMENTS

| | | |
|---|---|---|
| CN | 106936515 | 7/2017 |
| CN | 207166726 | 3/2018 |
| CN | 108712764 | 10/2018 |
| EP | 3355516 A1 | 8/2018 |
| TW | 200803411 | 1/2008 |

OTHER PUBLICATIONS

WIPO, International Search Report for PCT/CN2019/107561, dated Nov. 26, 2019.
EPO, Extended European Search Report for EP Application No. 19883861.7, dated Nov. 30, 2021.

\* cited by examiner

METHOD FOR ELECTROMAGNETIC INTERFERENCE ADJUSTMENT AND RELATED DEVICES

CROSS-REFERENCE TO RELATED APPLICATIONS

This application is a continuation of International Application No. PCT/CN2019/107561, filed on Sep. 24, 2019, which claims priority to Chinese Patent Application No. 201811360758.0, filed on Nov. 15, 2018, the entire disclosures of which are incorporated herein by reference.

TECHNICAL FIELD

This disclosure relates to the technical filed of electronic devices, and particularly to a method for electromagnetic interference adjustment and related devices.

BACKGROUND

When a Bluetooth function of electronic devices is enabled and a bus of a mobile industry processor interface (MIPI), which is used for data transmission, works at a fixed frequency, if a frequency division or a frequency multiplication of the frequency falls within an operating frequency range of 2.4 GHz-2.485 GHz of Bluetooth assembly, Bluetooth communication will be affected. Different frequencies of the MIPI which fall within the operating frequency range of the Bluetooth assembly will cause different degrees of interference to Bluetooth communication. Severe interference will lead to poor quality, disconnection, service failure, and other problems of Bluetooth communication.

SUMMARY

Disclosed herein are implementations of a method for electromagnetic interference adjustment and related devices.

According to a first aspect, implementations provide a method for electromagnetic interference adjustment. The method for electromagnetic interference adjustment is applicable to an electronic device including a display, a Bluetooth assembly, and an application processor (AP) coupled with the display and the Bluetooth assembly. The method includes the following.

A current first operating frequency of a mobile industry processor interface (MIPI) of the display is obtained by the AP. In response to detecting that a screen state is a screen-on state and the Bluetooth assembly is enabled, a current second operating frequency of the Bluetooth assembly is obtained by the AP. Electromagnetic interference in the electronic device is detected by the AP according to the first operating frequency and the second operating frequency. In response to the detected electromagnetic interference, a target operating frequency of the MIPI is determined, and the operating frequency of the MIPI is adjusted from the first operating frequency to the target operating frequency by the AP.

According to a second aspect, implementations provide an electronic device. The electronic device includes a processor, a memory, a communication interface, and one or more programs stored in the memory. The one or more programs are configured to be executed by the processor and include instructions configured to perform operations of the method in the first aspect.

According to a third aspect, implementations provide a non-transitory computer-readable storage medium. The non-transitory computer-readable storage medium is configured to store a computer program for electronic data interchange. The computer program causes a computer to execute all or part of operations of the method in the first aspect.

BRIEF DESCRIPTION OF THE DRAWINGS

To describe technical solutions in implementations of the present disclosure more clearly, the following briefly introduces accompanying drawings required for illustrating the implementations. Apparently, the accompanying drawings in the following description illustrate some implementations of the present disclosure. Those of ordinary skill in the art may also obtain other drawings based on these accompanying drawings without creative efforts.

DETAILED DESCRIPTION

Technical solutions in implementations of the present disclosure will be described clearly and completely hereinafter with reference to the accompanying drawings described. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", and the like used in the specification, the claims, and the accompany drawings of the present disclosure are used to distinguish different objects rather than describe a particular order. The terms "include", "include", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

The electronic device involved in the implementations of the present disclosure may include various handheld devices, in-vehicle devices, wireless headsets, computing devices that have wireless communication functions or other processing devices connected to the wireless modem, as well as various forms of user equipment (UE), mobile stations (MS), terminal devices, and the like. The electronic device can be, for example, a smart phone, a tablet computer, a headset box, and so on. For the convenience of description, the above-mentioned devices are collectively referred to as an electronic device.

Figure 1:
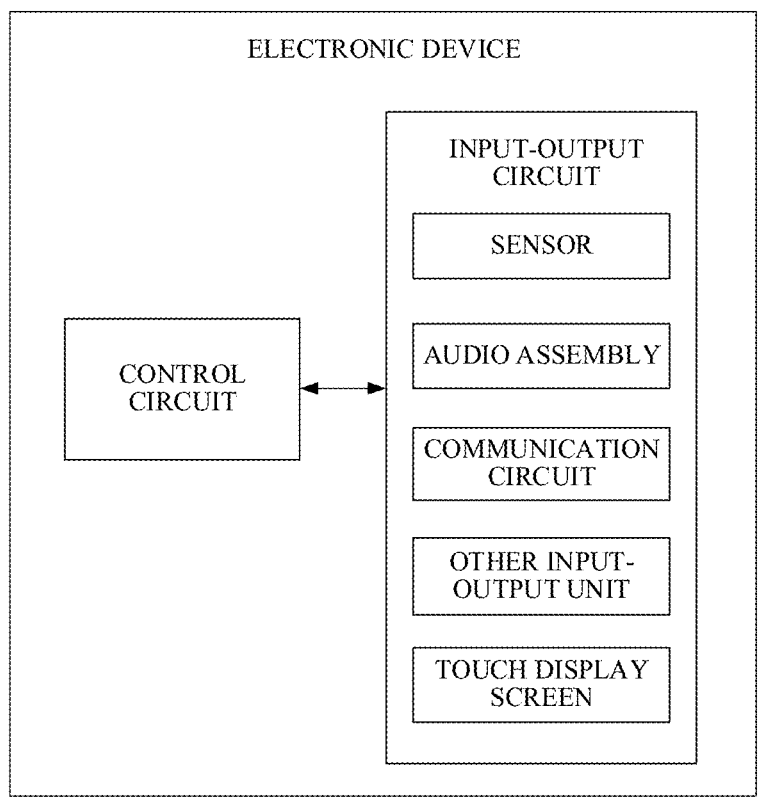
FIG. 1 is a schematic structural diagram illustrating an electronic device according to implementations.

FIG. 1 is a schematic structural diagram illustrating an electronic device according to implementations. As illustrated in FIG. 1, the electronic device includes a control circuit and an input-output circuit. The input-output circuit is coupled with the control circuit.

The control circuit can include a store-and-process circuit. The store-and-process circuit has a storing circuit which may be a memory, such as a hard drive memory, a non-transitory memory (such as a flash memory, other electronically programmable read-only memories used to form a solid-state drive, or the like), a transitory memory (such as a static random access memory, a dynamic random access memory, or the like), or the like, and the disclosure is not limited in this regard. The store-and-process circuit has a processing circuit to control operations of the electronic device. The processing circuit can be implemented based on one or more microprocessors, microcontrollers, digital signal processors, baseband processors, power management units, audio codec chips, application-specific integrated circuits, display driver integrated circuits, or the like.

The store-and-process circuit can be configured to run software of the electronic device, for example, an application playing incoming call alert sound, an application playing short message alert sound, an application playing alarm clock alert sound, an application playing media files, a voice over Internet protocol (VOIP) phone call application, an operating system function, etc. These applications can be used to perform some control operations such as playing incoming call alert sound, playing short message alert sound, playing alarm clock alert sound, playing media files, making a voice phone call, and other functions of the electronic device, which is not limited herein.

The input-output circuit can be configured to achieve data input and data output of the electronic device, that is, to allow the electronic device to receive data from an external device and also allow the electronic device to output data to an external device.

The input-output circuit can further include a sensor. The sensor can include an ambient light sensor, an optical or capacitive infrared proximity sensor, an ultrasonic sensor, a touch sensor (e.g., based on an optical touch sensor and/or a capacitive touch sensor, where the touch sensor may be a part of a touch display screen or may be used independently as a touch sensor structure), an acceleration sensor, a gravity sensor, and other sensors. The input-output circuit can further include an audio assembly. The audio assembly is configured to provide the electronic device with audio input and output functions. The audio assembly may include tone generators and other assemblies for generating and detecting sound.

The input-output circuit can further include one or more display screens. The display screens may include one or more of a liquid crystal display screen, an organic light emitting diode (OLED) display screen, an electronic ink display screen, a plasma display screen, display screens based on other display technologies. As an example, the display screen includes an array of touch sensors (i.e., the display screen can be a touch display screen). The touch sensor may be a capacitive touch sensor formed by an array of transparent touch sensor electrodes (e.g., indium tin oxide (ITO) electrodes), or may be a touch sensor formed with other touch technologies, such as acoustic touch, pressure sensitive touch, resistance touch, optical touch, and the like, and implementations are not limited thereto.

The input-output circuit can further include a communication circuit. The communication circuit is configured to provide the electronic device with the ability to communicate with external devices. For instance, the communication circuit includes analog/digital input-output interface circuits and wireless communication circuits based on radio frequency signals and/or optical signals. The wireless communication circuit of the communication circuit may include a radio frequency transceiver circuit, a power amplifier circuit, a low-noise amplifier, a switch, a filter, and an antenna. As an example, the wireless communication circuit of the communication circuit includes a circuit for supporting near field communication (NFC) by transmitting and receiving near field coupled electromagnetic signals. The communication circuit may include an NFC antenna and an NFC transceiver. The communication circuit may further include transceivers and antennas for cellular telephone, transceiver circuits and antennas for wireless local area network, and the like.

The input-output circuit can further include other input-output units. The other input-output units may include buttons, joysticks, click wheels, scroll wheels, touch pads, keypads, keyboards, cameras, LEDs, and other status indicators.

The electronic device may further include a battery (not illustrated in FIG. 1) for powering the electronic device.

Hereinafter, the implementations of the disclosure will be interpreted with reference to the accompanying drawings.

Figure 2:
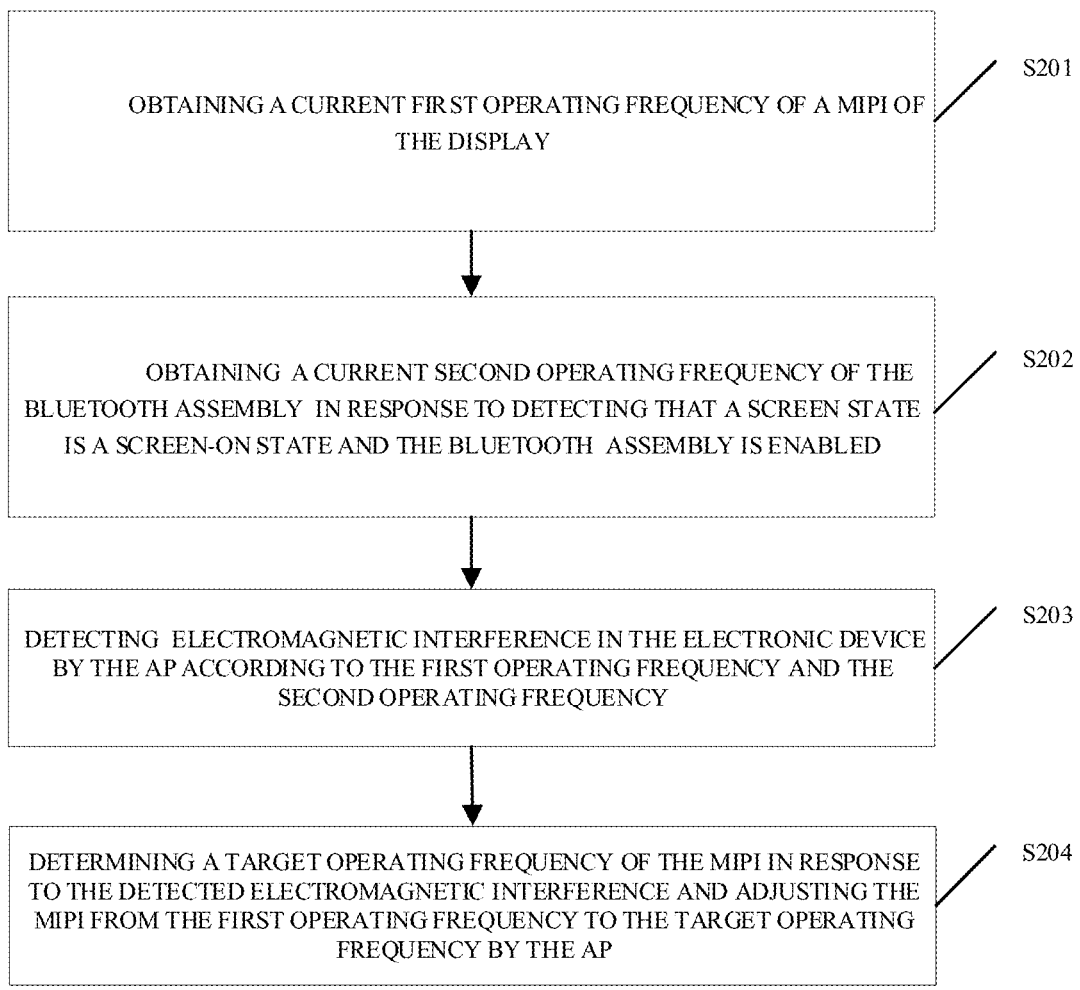
FIG. 2 is a schematic flow chart illustrating a method for electromagnetic interference adjustment according to implementations.

FIG. 2 is a schematic flow chart illustrating a method for electromagnetic interference adjustment according to implementations. The method is applicable to the electronic device of FIG. 1. The electronic device includes a display, a Bluetooth assembly, and an application processor (AP) coupled with the display and the Bluetooth assembly. As illustrated in FIG. 2, the method for electromagnetic interference adjustment begins at block 201.

At block 201, the electronic device obtains a current first operating frequency of a mobile industry processor interface (MIPI) of the display through the AP.

The first operating frequency may be one or more operating frequencies. When the MIPI of the display works at a fixed frequency, a frequency division point or frequency multiplication point of the frequency of the MIPI may fall within an operating frequency range of 2.4 GHz-2.485 GHz of Bluetooth, which may cause electromagnetic interference to Bluetooth communication. At block 202, the electronic device obtains a current second operating frequency of the Bluetooth assembly in response to detecting that a screen state is a screen-on state through the AP and the Bluetooth assembly is enabled.

In implantations of the present disclosure, in response to detecting that the screen state of the display of the electronic device is a screen-off state, stop sending the first operating frequency of the Bluetooth assembly to the AP, so as to avoid power consumption generated by waking up the AP in the screen-off state.

At block 203, the electronic device detects, through the AP, whether there is electromagnetic interference in the electronic device according to the first operating frequency and the second operating frequency.

According to the current first operating frequency of the MIPI and the second operating frequency of the Bluetooth assembly, whether there is electromagnetic interference in the electronic equipment can be determined.

At block 204, based on a determination that there is electromagnetic interference, the electronic device determines a target operating frequency of the MIPI and adjusts, through the AP, the MIPI from the first operating frequency to the target operating frequency.

According to the method for electromagnetic interference adjustment and related devices provided in the implementations, the current first operating frequency of the MIPI of the display is obtained through the AP. The screen state of the display is detected through the AP, and in response to detecting that the screen state is a screen-on state and the Bluetooth assembly is enabled, the current second operating frequency of the Bluetooth assembly is obtained through the AP. Whether there is electromagnetic interference in the electronic device is detected through the AP according to the first operating frequency and the second operating frequency. Based on a determination that there is electromagnetic interference, the target operating frequency of the MIPI is determined, and the operating frequency of the MIPI is adjusted from the first operating frequency to the target operating frequency through the AP. As when the electronic device activates the Bluetooth assembly, the electronic device can detect whether the MIPI causes channel interference to Bluetooth communication according to the first operating frequency of the MIPI and the current second operating frequency of the Bluetooth assembly, thereby dynamically adjusting the operating frequency of the of the MIPI to reduce channel interference, which is conducive to improving intelligence and accuracy of electromagnetic interference adjustment of the electronic device, and improving quality of Bluetooth communication.

As an implementation, the electronic device detects whether there is electromagnetic interference in the electronic device according to the first operating frequency and the second operating frequency as follows. A set of interference channel lists is obtained, where the set of interference channel lists includes multiple interference channel lists, each of the multiple interference channel lists corresponds to one of multiple operating frequencies of the MIPI, each of the multiple interference channel lists contains interferences levels of a corresponding operating frequency of the MIPI to multiple operating frequencies of the Bluetooth assembly, interference levels of at least one frequency multiplication of the corresponding operating frequency of the MIPI to the multiple operating frequencies of the Bluetooth assembly, and interference levels of at least one frequency division of the corresponding operating frequency of the MIPI to the multiple operating frequencies of the Bluetooth assembly, where the interference level is indicative of a degree of interference of an operating frequency of the MIPI to an operating frequency of the Bluetooth assembly. An interference level of the first operating frequency to the second operating frequency is obtained by querying the set of preset interference channel lists based on the first operating frequency and the second operating frequency as querying identifiers. Whether there is electromagnetic interference in the electronic device is detected according to the interference level.

The set of interference channel lists can be set in advance in the electronic device, and each interference channel list in the set corresponds to an operating frequency of the MIPI. When the operating frequency of the MIPI is fixed, interference levels of the MIPI to different operating frequencies of the Bluetooth assembly can be obtained by a tester through test.

The set of interference channel lists includes multiple operating frequencies of the MIPI and interference channel lists corresponding to each of the multiple operating frequencies. Each interference channel list contains interferences levels of a corresponding operating frequency of the MIPI to multiple operating frequencies of the Bluetooth assembly, where the interference level is indicative of a degree of interference of an operating frequency of the MIPI to an operating frequency of the Bluetooth assembly.

Each interference channel list further contains interference levels of at least one frequency multiplication of the corresponding operating frequency of the MIPI to the multiple operating frequencies of the Bluetooth assembly.

Each interference channel list further contains interference levels of at least one frequency division of the corresponding operating frequency of the MIPI to the multiple operating frequencies of the Bluetooth assembly.

It can be seen that, in this implementation, after the first operating frequency of the MIPI and the second operating frequency of the Bluetooth assembly are determined, obtain the interference level of the first operating frequency to the second operating frequency by querying the set of preset interference channel lists based on the first operating frequency and the second operating frequency as querying identifiers, which is helpful to determine whether the MIPI causes electromagnetic interference to operation of the Bluetooth assembly.

As an implementation, the electronic device detects whether there is electromagnetic interference in the electronic device according to the interference level as follows. The electronic device determines that the MIPI causes electromagnetic interference to the Bluetooth assembly in response to detecting that the interference level of the first operating frequency to the second operating frequency is greater than a preset level.

The interference level is indicative of a degree of interference of an operating frequency of the MIPI to an operating frequency of the Bluetooth assembly. When the MIPI causes electromagnetic interference to the Bluetooth assembly, interference can be divided into multiple levels in advance according to degrees or magnitude of electromagnetic interference. When the interference level is detected to be greater than the preset level, it indicates a large interference to Bluetooth communication, and dynamic frequency adjustment of the MIPI is needed. At this time, it can be determined that the MIPI causes electromagnetic interference to the Bluetooth assembly.

In this implementation, when the interference level of the first operating frequency to the second operating frequency is greater than the preset level, it can be determined that the MIPI causes electromagnetic interference to the Bluetooth assembly, and dynamic frequency adjustment of the MIPI is needed, which is beneficial to eliminating or reducing interference to Bluetooth communication through adjustment of the operating frequency of the MIPI.

As an implementation, the electronic device determines the target operating frequency of the MIPI as follows. At least one operating frequency, an interference level of which to the second operating frequency is less than a preset level, is obtained, by querying the set of preset interference channel lists based on the second operating frequency as a querying identifier. One of the at least one operating frequency is selected as the target operating frequency of the MIPI.

Based on the second operating frequency as the querying identifier, the at least one operating frequency, an interference level of which to the second operating frequency is less than a preset level when the Bluetooth assembly works at the second operating frequency, can be determined from the multiple operating frequencies of the MIPI. In this way, the target operating frequency of the MIPI can be selected from the at least one operating frequency.

It can be seen that in this implementation, based on the second operating frequency of the Bluetooth assembly as the querying identifier, the at least one operating frequency of the MIPI can be determined, so that interference levels of the MIPI to the Bluetooth assembly is less than the preset level, and the target operating frequency can be selected from the at least one operating frequency so that the frequency of the MIPI can be adjusted.

As an implementation, the electronic device selects one of the at least one operating frequency as the target operating frequency of the MIPI as follows. For each of the at least one operating frequency, power consumption of the display is determined. An operating frequency corresponding to the lowest power consumption is selected as the target operating frequency of the MIPI.

When the MIPI works at different operating frequencies, the display will have different power consumption. Therefore, for each of the at least one operating frequency, power consumption of the display can be determined, and the operating frequency corresponding to the lowest power consumption can be selected as the target operating frequency of the MIPI.

In this implementation, after the at least one operating frequency of the MIPI, an interference level of which to Bluetooth assembly that works at the second operating frequency is less than a preset level, is determined, for each of the at least one operating frequency of the MIPI, power consumption of the display can be determined, and the operating frequency corresponding to the lowest power consumption can be selected as the target operating frequency of the MIPI, so that the operating frequency of the MIPI can be adjusted from the first operating frequency to the target operating frequency, thereby reducing electromagnetic interference to the Bluetooth assembly and improving quality of Bluetooth communication.

As an implementation, the electronic device selects one of the at least one operating frequency as the target operating frequency of the MIPI as follows. For each of the at least one operating frequency, a frame rate of the display is determined. An operating frequency corresponding to the highest frame rate is selected as the target operating frequency of the MIPI.

When the MIPI works at different operating frequencies, the display will have different frame rates. The higher the frame rate, the better the user experience in using the display. Therefore, for each of the at least one operating frequency of the MIPI, a frame rate of the display is determined. The operating frequency corresponding to the highest frame rate can be selected as the target operating frequency of the MIPI.

In this implementation, after the at least one operating frequency of the MIPI, an interference level of which to Bluetooth assembly that works at the second operating frequency is less than a preset level, is determined, for each of the at least one operating frequency, a frame rate of the display is determined. The operating frequency corresponding to the highest frame rate can be selected as the target operating frequency of the MIPI, so that the operating frequency of the MIPI can be adjusted from the first operating frequency to the target operating frequency, thereby reducing electromagnetic interference to the Bluetooth assembly and improving quality of Bluetooth communication.

As an implementation, the electronic device determines the target operating frequency of the MIPI as follows. One of multiple operating frequencies of the MIPI that causes the lowest interference level to the second operating frequency is determined as the target operating frequency by querying the set of preset interference channel lists based on the second operating frequency as a querying identifier.

In this implementation, by querying the set of preset interference channel lists based on the second operating frequency as a querying identifier, one of multiple operating frequencies of the MIPI that causes the lowest interference level to the second operating frequency can be determined as the target operating frequency, regardless of power consumption and a frame rate of the display. After the target frequency is determined, the operating frequency of the MIPI can be switched quickly from the first operating frequency to the target operating frequency, so as to reduce electromagnetic interference degree of the electronic device rapidly.

As an implementation, the electronic device can further establish a dynamic frequency scaling strategy, where the dynamic frequency scaling strategy is configured to adjust the MIPI from the first operating frequency to the target operating frequency in response to detecting that the MIPI works at the first operating frequency and the Bluetooth assembly works at the second operating frequency.

In this implementation, after the second operating frequency of the MIPI is determined according to the first operating frequency of the MIPI and the second operating frequency of the Bluetooth assembly, the dynamic frequency scaling strategy for the MIPI can be established. Through the dynamic frequency scaling strategy, when the MIPI is detected to be working at the first operating frequency and the Bluetooth assembly is detected to be working at the second operating frequency next time, the MIPI can be directly switched from the first operating frequency to the target operating frequency, so as to improve quality of Bluetooth communication.

As an implementation, the electronic device can switch, through the AP, the MIPI from the target operating frequency back to the first operating frequency in response to detecting that the Bluetooth assembly is turned off.

In this implementation, the MIPI initially works at the first operating frequency. The first operating frequency may be a default operating frequency of the MIPI, or the best operating frequency in a current state. In the present disclosure, in order to reduce electromagnetic interference between the MIPI and the Bluetooth assembly, the MIPI is switched from the first operating frequency to the second operating frequency. When the Bluetooth assembly stops working, the MIPI can be restored from the target operating frequency to the initial first operating frequency, so as to improve working efficiency of the MIPI without causing electromagnetic interference.

Figure 3:
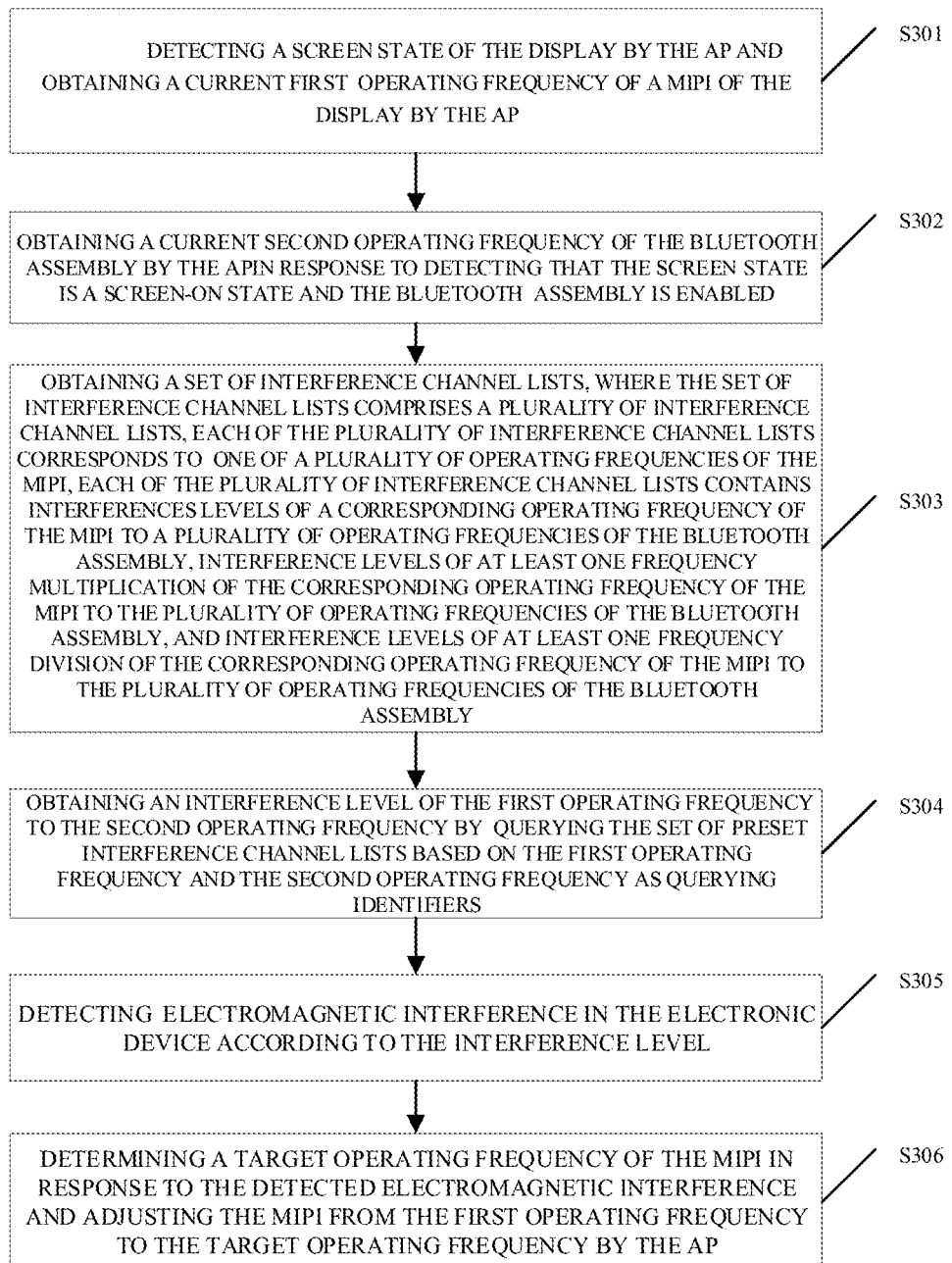
FIG. 3 is a schematic flow chart illustrating a method for electromagnetic interference adjustment according to other implementations.

FIG. 3 is a schematic flow chart illustrating a method for electromagnetic interference adjustment according to other implementations. The method is applicable to the electronic device of FIG. 1. The electronic device includes a display, a Bluetooth assembly, and an AP coupled with the display and the Bluetooth assembly. As illustrated in FIG. 3, the method for electromagnetic interference adjustment begins at block 301.

At block 301, the electronic device detects a screen state of the display through the AP and obtains a current first operating frequency of a MIPI of the display through the AP.

At block 302, the electronic device obtains a current second operating frequency of the Bluetooth assembly in response to detecting that the screen state is a screen-on state and the Bluetooth assembly is enabled.

At block 303, the electronic device obtains a set of interference channel lists, where the set of interference channel lists includes multiple interference channel lists, each of the multiple interference channel lists corresponds to one of multiple operating frequencies of the MIPI, each of the multiple interference channel lists contains interferences levels of a corresponding operating frequency of the MIPI to multiple operating frequencies of the Bluetooth assembly, interference levels of at least one frequency multiplication of the corresponding operating frequency of the MIPI to the multiple operating frequencies of the Bluetooth assembly, and interference levels of at least one frequency division of the corresponding operating frequency of the MIPI to the multiple operating frequencies of the Bluetooth assembly.

At block 304, the electronic device obtains an interference level of the first operating frequency to the second operating frequency by querying the set of preset interference channel lists based on the first operating frequency and the second operating frequency as querying identifiers.

At block 305, the electronic device detects whether there is electromagnetic interference in the electronic device according to the interference level.

At block 306, based on a determination that there is electromagnetic interference, the electronic device determines a target operating frequency of the MIPI, and adjusts, through the AP, the MIPI from the first operating frequency to the target operating frequency.

According to the method for electromagnetic interference adjustment and related devices provided in the implementations, the current first operating frequency of the MIPI of the display is obtained through the AP. The screen state of the display is detected through the AP, and in response to detecting that the screen state is a screen-on state and the Bluetooth assembly is enabled, the current second operating frequency of the Bluetooth assembly is obtained through the AP. Whether there is electromagnetic interference in the electronic device is detected through the AP according to the first operating frequency and the second operating frequency. Based on a determination that there is electromagnetic interference, the target operating frequency of the MIPI is determined and the operating frequency of the MIPI is adjusted from the first operating frequency to the target operating frequency through the AP. As when the electronic device activates the Bluetooth assembly, the electronic device can detect whether the MIPI causes channel interference to Bluetooth communication according to the first operating frequency of the MIPI and the current second operating frequency of the Bluetooth assembly, thereby dynamically adjusting the operating frequency of the of the MIPI to reduce channel interference, which is conducive to improving intelligence and accuracy of electromagnetic interference adjustment of the electronic device, and improving quality of Bluetooth communication.

Additionally, after the first operating frequency of the MIPI and the second operating frequency of the Bluetooth assembly are determined, obtain the interference level of the first operating frequency to the second operating frequency by querying the set of preset interference channel lists based on the first operating frequency and the second operating frequency as querying identifiers, which is helpful to determine whether the MIPI causes electromagnetic interference to operation of the Bluetooth assembly.

Figure 4:
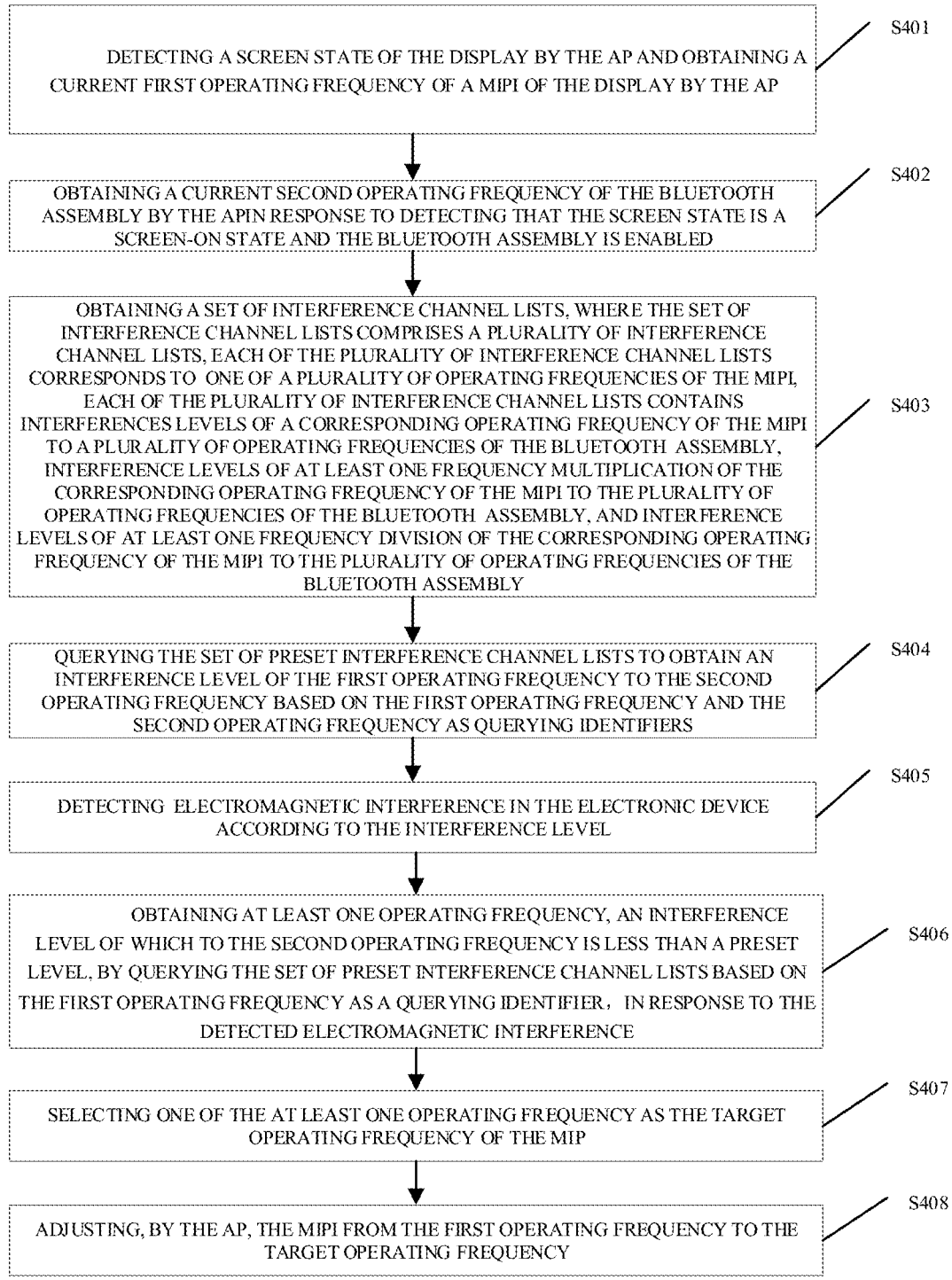
FIG. 4 is a schematic flow chart illustrating a method for electromagnetic interference adjustment according to other implementations.

In accordance with the implementations of FIG. 2 and FIG. 3, FIG. 4 is a schematic flow chart illustrating a method for electromagnetic interference adjustment according to other implementations. The method is applicable to the electronic device of FIG. 1. The electronic device includes a display, a Bluetooth assembly, and an AP coupled with the display and the Bluetooth assembly. As illustrated in FIG. 4, the method for electromagnetic interference adjustment begins at block 401.

At block 401, the electronic device detects a screen state of the display through the AP, and obtains a current first operating frequency of a MIPI of the display through the AP.

At block 402, the electronic device obtains a current second operating frequency of the Bluetooth assembly through the AP in response to detecting that the screen state is a screen-on state and the Bluetooth assembly is enabled.

At block 403, the electronic device obtains a set of interference channel lists, where the set of interference channel lists includes multiple interference channel lists, each of the multiple interference channel lists corresponds to one of multiple operating frequencies of the MIPI, each of the multiple interference channel lists contains interferences levels of a corresponding operating frequency of the MIPI to multiple operating frequencies of the Bluetooth assembly, interference levels of at least one frequency multiplication of the corresponding operating frequency of the MIPI to the multiple operating frequencies of the Bluetooth assembly, and interference levels of at least one frequency division of the corresponding operating frequency of the MIPI to the multiple operating frequencies of the Bluetooth assembly.

At block 404, the electronic device obtains an interference level of the first operating frequency to the second operating frequency by querying the set of preset interference channel lists based on the first operating frequency and the second operating frequency as querying identifiers.

At block 405, the electronic device detects whether there is electromagnetic interference in the electronic device according to the interference level.

At block 406, based on a determination that there is electromagnetic interference, the electronic device obtains at least one operating frequency, an interference level of which to the second operating frequency is less than a preset level, by querying the set of preset interference channel lists based on the second operating frequency as a querying identifier.

At block 407, the electronic device selects one of the at least one operating frequency as a target operating frequency of the MIPI.

At block 408, the electronic device adjusts, through the AP, the MIPI from the first operating frequency to the target operating frequency.

According to the method for electromagnetic interference adjustment and related devices provided in the implementations, the current first operating frequency of the MIPI of the display is obtained through the AP. The screen state of the display is detected through the AP, and in response to detecting that the screen state is a screen-on state and the Bluetooth assembly is enabled, the current second operating frequency of the Bluetooth assembly is obtained through the AP. Whether there is electromagnetic interference in the electronic device is detected through the AP according to the first operating frequency and the second operating frequency. Based on a determination that there is electromagnetic interference, the target operating frequency of the MIPI is determined and the operating frequency of the MIPI is adjusted from the first operating frequency to the target operating frequency through the AP. As when the electronic device activates the Bluetooth assembly, the electronic device can detect whether the MIPI causes channel interference to Bluetooth communication according to the first operating frequency of the MIPI and the current second operating frequency of the Bluetooth assembly, thereby dynamically adjusting the operating frequency of the of the MIPI to reduce channel interference, which is conducive to improving intelligence and accuracy of electromagnetic interference adjustment of the electronic device, and improving quality of Bluetooth communication.

Additionally, after the first operating frequency of the MIPI and the second operating frequency of the Bluetooth assembly are determined, obtain the interference level of the first operating frequency to the second operating frequency by querying the set of preset interference channel lists based on the first operating frequency and the second operating frequency as querying identifiers, which is helpful to determine whether the MIPI causes electromagnetic interference to operation of the Bluetooth assembly.

Additionally, based on the second operating frequency of the Bluetooth assembly as the querying identifier, the at least one operating frequency of the MIPI can be determined, so that interference levels of the MIPI to the Bluetooth assembly is less than the preset level, and the target operating frequency can be selected from the at least one operating frequency so that the frequency of the MIPI can be adjusted.

Figure 5:
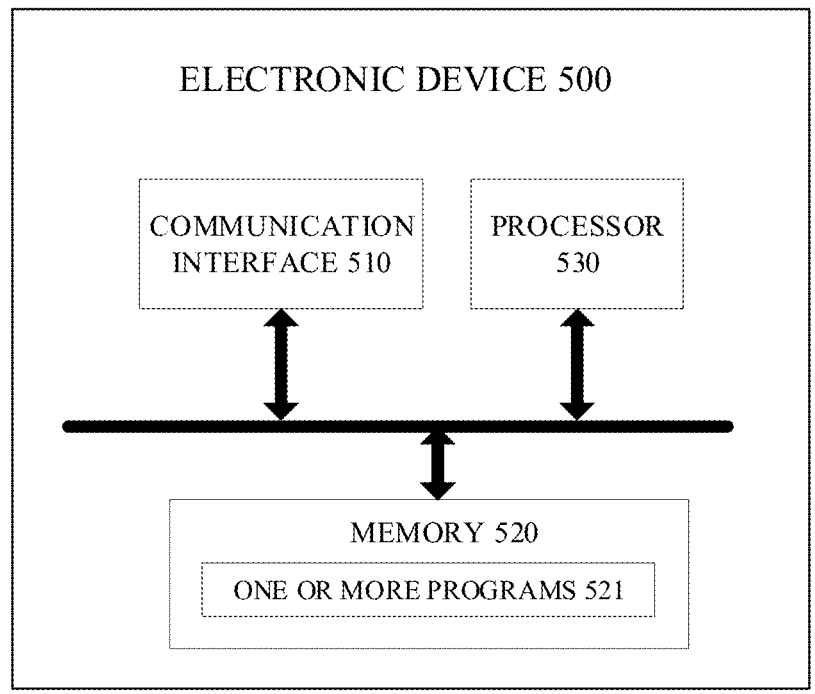
FIG. 5 is a schematic structural diagram illustrating an electronic device according to other implementations.

In accordance with the implementations of FIG. 2, FIG. 3, and FIG. 4, FIG. 5 is a schematic structural diagram illustrating an electronic device 500 according to implementations. One or more applications and an operating system are running in the electronic device 500. As illustrated in FIG. 5, the electronic device 500 includes a processor 510, a memory 520, a communication interface 530, and one or more programs 521 stored in the memory 520. The one or more programs 521 are configured to be executed by the processor 510 and include instructions configured to perform the following operations.

A current first operating frequency of a MIPI of the display is obtained through the AP. A screen state of the display is detected through the AP, and in response to detecting that the screen state is a screen-on state and the Bluetooth assembly is enabled, a current second operating frequency of the Bluetooth assembly is obtained through the AP. A current second operating frequency of a MIPI of the display is obtained through the AP. Whether there is electromagnetic interference in the electronic device is detected through the AP according to the first operating frequency and the second operating frequency. Based on a determination that there is electromagnetic interference, a target operating frequency of the MIPI is determined, and the operating frequency of the MIPI is adjusted from the first operating frequency to the target operating frequency through the AP.

According to the method for electromagnetic interference adjustment and related devices provided in the implementations, the current first operating frequency of the MIPI of the display is obtained through the AP. The screen state of the display is detected through the AP, and in response to detecting that the screen state is a screen-on state and the Bluetooth assembly is enabled, the current second operating frequency of the Bluetooth assembly is obtained through the AP. Whether there is electromagnetic interference in the electronic device is detected through the AP according to the first operating frequency and the second operating frequency. Based on a determination that there is electromagnetic interference, the target operating frequency of the MIPI is determined and the operating frequency of the MIPI is adjusted from the first operating frequency to the target operating frequency through the AP. As when the electronic device activates the Bluetooth assembly, the electronic device can detect whether the MIPI causes channel interference to Bluetooth communication according to the first operating frequency of the MIPI and the current second operating frequency of the Bluetooth assembly, thereby dynamically adjusting the operating frequency of the of the MIPI to reduce channel interference, which is conducive to improving intelligence and accuracy of electromagnetic interference adjustment of the electronic device, and improving quality of Bluetooth communication.

As an implementation, in terms of detecting whether there is electromagnetic interference in the electronic device according to the first operating frequency and the second operating frequency, the one or more programs 521 include instructions configured to perform the following operations.

A set of interference channel lists is obtained, where the set of interference channel lists includes multiple interference channel lists, each of the multiple interference channel lists corresponds to one of multiple operating frequencies of the MIPI, each of the multiple interference channel lists contains interferences levels of a corresponding operating frequency of the MIPI to multiple operating frequencies of the Bluetooth assembly, interference levels of at least one frequency multiplication of the corresponding operating frequency of the MIPI to the multiple operating frequencies of the Bluetooth assembly, and interference levels of at least one frequency division of the corresponding operating frequency of the MIPI to the multiple operating frequencies of the Bluetooth assembly, where the interference level is indicative of a degree of interference of an operating frequency of the MIPI to an operating frequency of the Bluetooth assembly. An interference level of the first operating frequency to the second operating frequency is obtained by querying the set of preset interference channel lists based on the first operating frequency and the second operating frequency as querying identifiers. Whether there is electromagnetic interference in the electronic device is detected according to the interference level.

As an implementation, in terms of detecting whether there is electromagnetic interference in the electronic device according to the interference level, the one or more programs 521 include instructions configured to perform the following operations. The MIPI is determined to cause electromagnetic interference to the Bluetooth assembly in response to detecting that the interference level of the first operating frequency to the second operating frequency is greater than a preset level.

As an implementation, in terms of determining the target operating frequency of the MIPI, the one or more programs 521 include instructions configured to perform the following operations. At least one operating frequency, an interference level of which to the second operating frequency is less than a preset level, is obtained by querying the set of preset interference channel lists based on the second operating frequency as a querying identifier. One of the at least one operating frequency is selected as the target operating frequency of the MIPI.

As an implementation, in terms of selecting one of the at least one operating frequency as the target operating frequency of the MIPI, the one or more programs 521 include instructions configured to perform the following operations.

For each of the at least one operating frequency, power consumption of the display is determined. An operating frequency corresponding to the lowest power consumption is selected as the target operating frequency of the MIPI.

As an implementation, in terms of selecting one of the at least one operating frequency as the target operating frequency of the MIPI, the one or more programs 521 include instructions configured to perform the following operations. For each of the at least one operating frequency, a frame rate of the display is determined. An operating frequency corresponding to the highest frame rate is selected as the target operating frequency of the MIPI.

As an implementation, in terms of determining the target operating frequency of the MIPI, the one or more programs 521 include instructions configured to perform the following operations. One of multiple operating frequencies of the MIPI that causes the lowest interference level to the second operating frequency is determined as the target operating frequency, by querying the set of preset interference channel lists based on the second operating frequency as a querying identifier.

As an implementation, the one or more programs 521 further include instructions configured to perform the following operations. A dynamic frequency scaling strategy is established, where the dynamic frequency scaling strategy is configured to adjust the MIPI from the first operating frequency to the target operating frequency in response to detecting that the MIPI works at the first operating frequency and the Bluetooth assembly works at the second operating frequency.

As an implementation, the one or more programs 521 further include instructions configured to perform the following operations. The MIPI is switched through the AP from the target operating frequency back to the first operating frequency in response to detecting that the Bluetooth assembly is turned off.

The foregoing solution of the implementations of the disclosure is mainly described from the viewpoint of execution process of the method. It can be understood that, in order to implement the above functions, the mobile terminal includes hardware structures and/or software modules corresponding to the respective functions. Those skilled in the art should readily recognize that, in combination with the example units and scheme steps described in the implementations disclosed herein, the present disclosure can be implemented in hardware or a combination of the hardware and computer software. Whether a function is implemented by way of the hardware or hardware driven by the computer software depends on the particular application and design constraints of the technical solution. Those skilled in the art may use different methods to implement the described functions for each particular application, but such implementation should not be considered as beyond the scope of the present disclosure.

According to the implementations of the disclosure, functional units may be divided for the mobile terminal in accordance with the foregoing method examples. For example, each functional unit may be divided according to each function, and two or more functions may be integrated in one processing unit. The above-mentioned integrated unit can be implemented in the form of hardware or software functional units. It should be noted that the division of units in the implementations of the present disclosure is schematic, and is merely a logical function division, and there may be other division manners in actual implementation.

Figure 6:
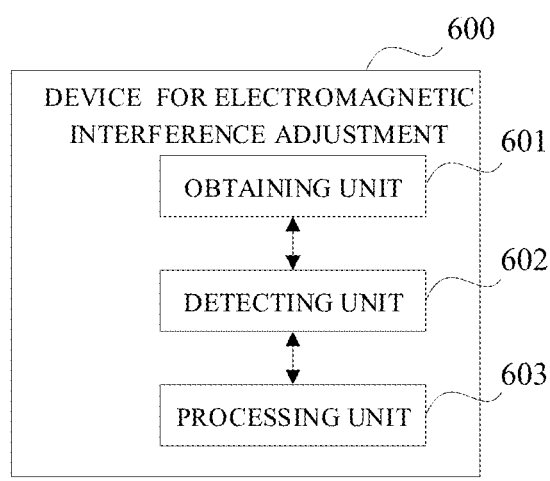
FIG. 6 is a schematic structural diagram illustrating a device for electromagnetic interference adjustment according to implementations.

FIG. 6 is a block diagram illustrating functional units of a device 600 for electromagnetic interference adjustment according to implementations. The device for electromagnetic interference adjustment is applicable to the electronic device of FIG. 1. The electronic device includes a display, a Bluetooth assembly, and an application processor (AP) coupled with the display and the Bluetooth assembly. As illustrated in FIG. 6, the device for electromagnetic interference adjustment includes an obtaining unit 601, a detecting unit 602, and a processing unit 603.

The obtaining unit 601 is configured to obtain a current first operating frequency of a MIPI of the display through the AP, and obtain a current second operating frequency of the Bluetooth assembly in response to detecting that a screen state is a screen-on state through the AP and the Bluetooth assembly is enabled.

The detecting unit 602 is configured to detect whether there is electromagnetic interference in the electronic device through the AP according to the first operating frequency and the second operating frequency.

The processing unit 603 is configured to determine a target operating frequency of the MIPI and adjust, through the AP, the MIPI from the first operating frequency to the target operating frequency, based on a determination that there is electromagnetic interference.

According to the method for electromagnetic interference adjustment and related devices provided in the implementations, the current second operating frequency of the MIPI of the display is obtained through the AP. The screen state of the display is detected through the AP, and in response to detecting that the screen state is a screen-on state and the Bluetooth assembly is enabled, the current second operating frequency of the Bluetooth assembly is obtained through the AP. Whether there is electromagnetic interference in the electronic device is detected through the AP according to the first operating frequency and the second operating frequency. Based on a determination that there is electromagnetic interference, the target operating frequency of the MIPI is determined, and the operating frequency of the MIPI is adjusted from the first operating frequency to the target operating frequency through the AP. As when the electronic device activates the Bluetooth assembly, the electronic device can detect whether the MIPI causes channel interference to Bluetooth communication according to the first operating frequency of the MIPI and the current second operating frequency of the Bluetooth assembly, thereby dynamically adjusting the operating frequency of the of the MIPI to reduce channel interference, which is conducive to improving intelligence and accuracy of electromagnetic interference adjustment of the electronic device, and improving quality of Bluetooth communication.

As an implementation, in terms of detecting whether there is electromagnetic interference in the electronic device according to the first operating frequency and the second operating frequency, the detecting unit 602 is configured to: obtain a set of interference channel lists, where the set of interference channel lists includes multiple interference channel lists, each of the multiple interference channel lists corresponds to one of multiple operating frequencies of the MIPI, each of the multiple interference channel lists contains interferences levels of a corresponding operating frequency of the MIPI to multiple operating frequencies of the Bluetooth assembly, interference levels of at least one frequency multiplication of the corresponding operating frequency of the MIPI to the multiple operating frequencies of the Bluetooth assembly, and interference levels of at least one frequency division of the corresponding operating frequency of the MIPI to the multiple operating frequencies of the Bluetooth assembly, where the interference level is indicative of a degree of interference of an operating frequency of the MIPI to an operating frequency of the Bluetooth assembly; obtain an interference level of the first operating frequency to the second operating frequency by querying the set of preset interference channel lists based on the first operating frequency and the second operating frequency as querying identifiers; detect whether there is electromagnetic interference in the electronic device according to the interference level.

As an implementation, in terms of detecting whether there is electromagnetic interference in the electronic device according to the interference level, the detecting unit 602 is configured to: determine that the MIPI causes electromagnetic interference to the Bluetooth assembly in response to detecting that the interference level of the first operating frequency to the second operating frequency is greater than a preset level.

As an implementation, in terms of determining the target operating frequency of the MIPI, the processing unit 603 is configured to: obtain at least one operating frequency, an interference level of which to the second operating frequency is less than a preset level, by querying the set of preset interference channel lists based on the second operating frequency as a querying identifier; select one of the at least one operating frequency as the target operating frequency of the MIPI.

As an implementation, in terms of selecting one of the at least one operating frequency as the target operating frequency of the MIPI, the processing unit 603 is configured to: for each of the at least one operating frequency, determine power consumption of the display; select an operating frequency corresponding to the lowest power consumption as the target operating frequency of the MIPI.

As an implementation, in terms of selecting one of the at least one operating frequency as the target operating frequency of the MIPI, the processing unit 603 is configured to: for each of the at least one operating frequency, determine a frame rate of the display; select an operating frequency corresponding to the highest frame rate as the target operating frequency of the MIPI.

As an implementation, in terms of determining the target operating frequency of the MIPI, the processing unit 603 is configured to: determine one of multiple operating frequencies of the MIPI that causes the lowest interference level to the second operating frequency as the target operating frequency, by querying the set of preset interference channel lists based on the second operating frequency as a querying identifier.

As an implementation, the processing unit 603 is further configured to: establish a dynamic frequency scaling strategy, where the dynamic frequency scaling strategy is configured to adjust the MIPI from the first operating frequency to the target operating frequency in response to detecting that the MIPI works at the first operating frequency and the Bluetooth assembly works at the second operating frequency.

As an implementation, the processing unit 603 is further configured to: switch, through the AP, the MIPI from the target operating frequency back to the first operating frequency in response to detecting that the Bluetooth assembly is turned off.

It is to be noted that, the electronic device described in the implementations of the disclosure is presented in the form of functional units. The term "unit" used herein should be understood as the broadest meaning as possible, and an object for implementing functions defined by each "unit" may be, for example, an integrated circuit (ASIC), a single circuit, a processor (shared, dedicated, or chipset) and a memory for executing one or more software or firmware programs, a combinational logic circuit, and/or other suitable components that can achieve the above described functions.

The obtaining unit 601, the detecting unit 502, and the processing unit 503 may be control circuits or processors.

Implementations further provide a non-transitory computer storage medium. The computer storage medium is configured to store a computer program for electronic data interchange. The computer program causes a computer to execute all or part of operations of the method of the above.

Implementations further provide a computer program product. The computer program product includes a non-transitory computer-readable storage medium storing a computer program. The computer program is operable to cause the computer execute all or part of operations of the method of the above. The computer program product may be a software installation package.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer readable storage when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a read-only memory (ROM), a random-access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer readable storage, which may include a flash memory, a ROM, a RAM, disk or CD, and so on.

The implementations of this application are described in detail above. Some examples are used herein to illustrate the principle and implementation manners of this application. The description of the above implementations is only used to help understand the method and core idea of this application. Meanwhile, for those of ordinary skill in the art, according to the idea of this application, there will be changes in the implementation manner and the application scope. In summary, contents of this specification should not be construed as a limitation on this application.

What is claimed is:

1. A method for electromagnetic interference adjustment, for an electronic device comprising a display, a Bluetooth assembly, and an application processor (AP) coupled with the display and the Bluetooth assembly, and the method comprising:
    obtaining a current first operating frequency of a mobile industry processor interface (MIPI) of the display by the AP;
    obtaining a current second operating frequency of the Bluetooth assembly in response to detecting that a screen state is a screen-on state by the AP and the Bluetooth assembly is enabled;
    detecting electromagnetic interference in the electronic device by the AP according to the first operating frequency and the second operating frequency; and
    determining a target operating frequency of the MIPI in response to the detected electromagnetic interference and adjusting the MIPI from the first operating frequency to the target operating frequency by the AP;
    wherein detecting the electromagnetic interference in the electronic device according to the first operating frequency and the second operating frequency comprises:
    obtaining a set of interference channel lists, wherein the set of interference channel lists comprises a plurality of interference channel lists, each of the plurality of interference channel lists corresponds to one of a plurality of operating frequencies of the MIPI, each of the plurality of interference channel lists contains interferences levels of a corresponding operating frequency of the MIPI to a plurality of operating frequencies of the Bluetooth assembly, interference levels of at least one frequency multiplication of the corresponding operating frequency of the MIPI to the plurality of operating frequencies of the Bluetooth assembly, and interference levels of at least one frequency division of the corresponding operating frequency of the MIPI to the plurality of operating frequencies of the Bluetooth assembly, wherein the interference level is indicative of a degree of interference of an operating frequency of the MIPI to an operating frequency of the Bluetooth assembly;
    obtaining an interference level of the first operating frequency to the second operating frequency by querying the set of interference channel lists based on the first operating frequency and the second operating frequency as querying identifiers; and
    detecting the electromagnetic interference in the electronic device according to the interference level.

2. The method of claim 1, wherein detecting the electromagnetic interference in the electronic device according to the interference level comprises:
    determining that the MIPI causes electromagnetic interference to the Bluetooth assembly in response to detecting that the interference level of the first operating frequency to the second operating frequency is greater than a preset level.

3. The method of claim 1, wherein determining the target operating frequency of the MIPI comprises:
    obtaining at least one operating frequency, an interference level of which to the second operating frequency is less than a preset level, by querying the set of interference channel lists based on the second operating frequency as a querying identifier; and
    selecting one of the at least one operating frequency as the target operating frequency of the MIPI.

4. The method of claim 3, wherein selecting one of the at least one operating frequency as the target operating frequency of the MIPI comprises:
    for each of the at least one operating frequency, determining power consumption of the display; and
    selecting an operating frequency corresponding to a lowest power consumption as the target operating frequency of the MIPI.

5. The method of claim 3, wherein selecting one of the at least one operating frequency as the target operating frequency of the MIPI comprises:
    for each of the at least one operating frequency, determining a frame rate of the display; and
    selecting an operating frequency corresponding to a highest frame rate as the target operating frequency of the MIPI.

6. The method of claim 1, wherein determining the target operating frequency of the MIPI comprises:
    determining one of a plurality of operating frequencies of the MIPI that causes a lowest interference level to the second operating frequency as the target operating frequency, by querying the set of interference channel lists based on the second operating frequency as a querying identifier.

7. The method of claim 1, further comprising:
    establishing a dynamic frequency scaling strategy, wherein the dynamic frequency scaling strategy is configured to adjust the MIPI from the first operating frequency to the target operating frequency in response to detecting that the MIPI works at the first operating frequency and the Bluetooth assembly works at the second operating frequency.

8. The method of claim 1, further comprising:
    switching the MIPI from the target operating frequency back to the first operating frequency by the AP in response to detecting that the Bluetooth assembly is turned off.

9. An electronic device comprising a processor, a memory, a communication interface, and one or more programs stored in the memory, wherein the one or more programs are configured to be executed by the processor and comprise instructions configured to:
  obtain a current first operating frequency of a mobile industry processor interface (MIPI) of a display through an AP;
  obtain a current second operating frequency of a Bluetooth assembly in response to detecting that a screen state is a screen-on state through the AP and the Bluetooth assembly is enabled;
  detect electromagnetic interference in the electronic device through the AP according to the first operating frequency and the second operating frequency; and
  determine a target operating frequency of the MIPI in response to the detected electromagnetic interference and adjust the MIPI from the first operating frequency to the target operating frequency through the AP;
  wherein in terms of detecting the electromagnetic interference in the electronic device according to the first operating frequency and the second operating frequency, the one or more programs comprise instructions configured to:
  obtain a set of interference channel lists, wherein the set of interference channel lists comprises a plurality of interference channel lists, each of the plurality of interference channel lists corresponds to one of a plurality of operating frequencies of the MIPI, each of the plurality of interference channel lists contains interferences levels of a corresponding operating frequency of the MIPI to a plurality of operating frequencies of the Bluetooth assembly, interference levels of at least one frequency multiplication of the corresponding operating frequency of the MIPI to the plurality of operating frequencies of the Bluetooth assembly, and interference levels of at least one frequency division of the corresponding operating frequency of the MIPI to the plurality of operating frequencies of the Bluetooth assembly, wherein the interference level is indicative of a degree of interference of an operating frequency of the MIPI to an operating frequency of the Bluetooth assembly;
  obtain an interference level of the first operating frequency to the second operating frequency by querying the set of interference channel lists based on the first operating frequency and the second operating frequency as querying identifiers; and
  detect the electromagnetic interference in the electronic device according to the interference level.

10. The electronic device of claim 9, wherein in terms of detecting the electromagnetic interference in the electronic device according to the interference level, the one or more programs comprise instructions configured to:
  determine that the MIPI causes electromagnetic interference to the Bluetooth assembly in response to detecting that the interference level of the first operating frequency to the second operating frequency is greater than a preset level.

11. The electronic device of claim 9, wherein in terms of determining the target operating frequency of the MIPI, the one or more programs comprise instructions configured to:
  obtain at least one operating frequency, an interference level of which to the second operating frequency is less than a preset level, by querying the set of interference channel lists based on the second operating frequency as a querying identifier; and
  select one of the at least one operating frequency as the target operating frequency of the MIPI.

12. The electronic device of claim 11, wherein in terms of selecting one of the at least one operating frequency as the target operating frequency of the MIPI, the one or more programs comprise instructions configured to:
  for each of the at least one operating frequency, determine power consumption of the display; and
  select an operating frequency corresponding to a lowest power consumption as the target operating frequency of the MIPI.

13. The electronic device of claim 11, wherein in terms of selecting one of the at least one operating frequency as the target operating frequency of the MIPI, the one or more programs comprise instructions configured to:
  for each of the at least one operating frequency, determine a frame rate of the display; and
  select an operating frequency corresponding to a highest frame rate as the target operating frequency of the MIPI.

14. The electronic device of claim 9, wherein in terms of determining the target operating frequency of the MIPI, the one or more programs comprise instructions configured to:
  determine one of a plurality of operating frequencies of the MIPI that causes a lowest interference level to the second operating frequency as the target operating frequency, by querying the set of interference channel lists based on the second operating frequency as a querying identifier.

15. The electronic device of claim 9, wherein the one or more programs further comprise instructions configured to:
  establish a dynamic frequency scaling strategy, wherein the dynamic frequency scaling strategy is configured to adjust the MIPI from the first operating frequency to the target operating frequency in response to detecting that the MIPI works at the first operating frequency and the Bluetooth assembly works at the second operating frequency.

16. The electronic device of claim 9, wherein the one or more programs further comprise instructions configured to:
  switch, through the AP, the MIPI from the target operating frequency back to the first operating frequency in response to detecting that the Bluetooth assembly is turned off.

17. A non-transitory computer-readable storage medium storing a computer program for electronic data interchange, wherein the computer program causes a computer to execute:
  obtaining a current first operating frequency of a mobile industry processor interface (MIPI) of a display of an electronic device;
  obtaining a current second operating frequency of a Bluetooth assembly in response to detecting that a screen state is a screen-on state and the Bluetooth assembly is enabled;
  detecting electromagnetic interference in the electronic device according to the first operating frequency and the second operating frequency; and
  determining a target operating frequency of the MIPI in response to the detected electromagnetic interference and adjusting the MIPI from the first operating frequency to the target operating frequency;
  wherein in terms of detecting the electromagnetic interference in the electronic device according to the first operating frequency and the second operating frequency, the computer program causes a computer to execute:
  obtaining a set of interference channel lists, wherein the set of interference channel lists comprises a plurality of interference channel lists, each of the plurality of interference channel lists corresponds to one of a plurality of operating frequencies of the MIPI, each of the plurality of interference channel lists contains interferences levels of a corresponding operating frequency of the MIPI to a plurality of operating frequencies of the Bluetooth assembly, interference levels of at least one frequency multiplication of the corresponding operating frequency of the MIPI to the plurality of operating frequencies of the Bluetooth assembly, and interference levels of at least one frequency division of the corresponding operating frequency of the MIPI to the plurality of operating frequencies of the Bluetooth assembly, wherein the interference level is indicative of a degree of interference of an operating frequency of the MIPI to an operating frequency of the Bluetooth assembly;

obtaining an interference level of the first operating frequency to the second operating frequency by querying the set of interference channel lists based on the first operating frequency and the second operating frequency as querying identifiers; and detecting the electromagnetic interference in the electronic device according to the interference level.

* * * * *